Figure 1:
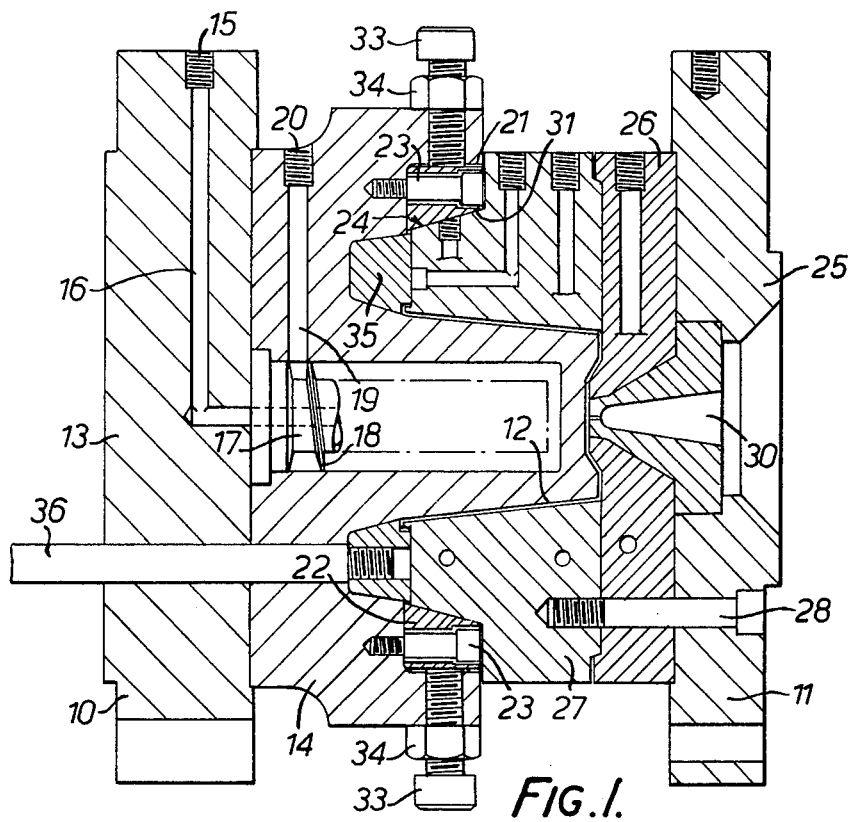

United States Patent [19]
Robinson

[11] 3,942,755
[45] Mar. 9, 1976

[54] MOULDS FOR USE ON INJECTION MOULDING MACHINES

[75] Inventor: Guy Desborough Robinson, Cookham Dene, England

[73] Assignee: Pioneer Plastic Containers Limited, Bedfont, Feltham, England

[22] Filed: Oct. 9, 1974

[21] Appl. No.: 513,306

[52] U.S. Cl............ 249/162; 425/242 R; 425/436 R
[51] Int. Cl.².. B28B 1/24; B28B 13/04; B29C 7/00; B41B 11/62
[58] Field of Search ............ 249/160, 161, 162, 58, 249/157, 159, 155; 425/346, 242, 423, 420, 387, 168, 468; 164/113, 137, 120, 397, 320, 339, 340, 341

[56] References Cited
UNITED STATES PATENTS

| 1,296,598 | 3/1913 | Jeffries............................ 164/340 X |
| 1,392,884 | 10/1921 | Washburn............................ 249/155 |
| 2,978,748 | 4/1961 | McCauley....................... 425/387 X |
| 3,535,739 | 10/1970 | Mehnert ............................ 425/168 |
| 3,647,337 | 3/1972 | Dega............................... 425/346 X |
| 3,712,779 | 1/1973 | Luginbuhl....................... 425/242 R |
| 3,804,570 | 4/1974 | Hoschele ......................... 425/420 X |

Primary Examiner—Francis S. Husar
Assistant Examiner—John S. Brown
Attorney, Agent, or Firm—Bacon & Thomas

[57] ABSTRACT

A mould for use in injection moulding containers, for example, comprises a pair of mould parts movable between open and closed positions and which define between them a mould cavity, co-operating frusto conical locating surfaces being provided on the mould parts for determining their relative radial positions with the locating surface on one of the mould parts being radially adjustable relative to the portions of the mould parts which define the cavity. The adjustable locating surface may be provided on a locating ring which is preferably divided into a plurality of segments, each of which is separately mounted on the mould part and individually adjustable in the radial direction by a respective screw.

6 Claims, 2 Drawing Figures

U.S. Patent   March 9, 1976   3,942,755

MOULDS FOR USE ON INJECTION MOULDING MACHINES

This invention relates to moulds for use on moulding machines of the injection type, intended or suitable for moulding thin walled containers or the like, in which it is desired to maintain small tolerances on radial dimensions of an article such as a plastic container.

In the past, in the moulding of very thin walled containers especially those with circular cross-section and near-cylindrical or frusto-conical shape, great difficulty has been encountered in maintaining the radial wall thickness. Even when the mould parts are made initially with sufficiently high accuracy to obtain a uniform wall thickness, it is the common experience that after a period of use, the wall thickness will vary and will be no longer uniform. Where very thin wall thicknesses are involved, this may lead to inadequate properties of the finished container.

The present invention is concerned with a form of mould structure which can be used to give consistent results over a substantial period of time.

Figure 2:
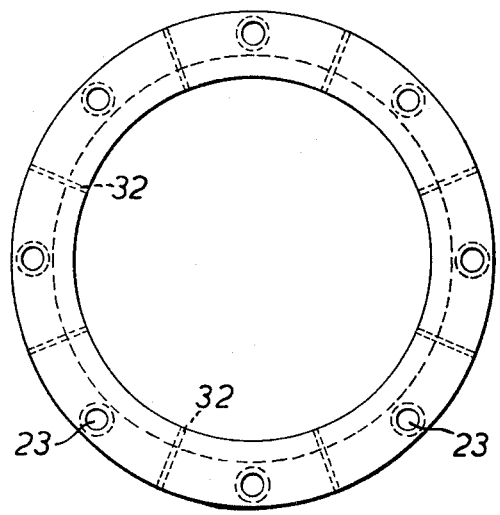

In accordance with the present invention there is provided a mould for use on an injection moulding machine, comprising a pair of mould parts which are axially movable towards and away from each other, and which in their closed position define a mould cavity, the said parts having co-operating locating surfaces which determine the relative radial positions of the mould parts, and wherein the locating surface on one of the mould parts is adjustable, in the radial direction, relative to the surfaces of the mould ports which border the mould cavity Other features and advantages of the invention will appear from the following description of an embodiment thereof, given by way of example, in conjunction with the accompanying drawings in which:

FIG. 1 is a longitudinal sectional view through a mould for an injection mould press and FIG. 2 is an end view of a locating member for the mould parts.

The mould shown in FIG. 1 comprises a male portion 10 and female portion 11; the two mould parts are designed for the moulding of a plastic container, of a shape indicated by the cavity designated by the reference numeral 12. The male portion of the mould comprises a backing plate 13, with a male mould member 14. The member 14 has a central opening for cooling water, admitted at an inlet port 15, leading to passage 16 and hence to the centre of an insert 17 which has a thin spiral fin 18, sitting in a recess in the mould member 14, and defining therewith a spiral water passageway, leading to an exit passage 19, at exit port 20.

The mould member 14 has a recess 21, in which is mounted a locating ring 22, held by a series of bolts 23. The locating ring has an internal conical locating surface 24.

The female portion of the mould has a backing plate 25 to which is secured a first mould member 26 and a second mould member 27, all secured together by means of bolts as at 28. The two mould members 26 and 27 together with mould member 14 define the mould cavity. The injection nozzle, through which the moulding material is injected in use, enters the recess 30. The mould member 27 has an external conical locating surface 31 which engages the conical surface 24 on the locating ring 22. By this means, the male and female members are accurately positioned radially, so that the cavity in which the container will be moulded has an accurately defined radial thickness.

However, it is found by experience that however accurately the parts are initially made and set up, the container wall thickness will vary. Accordingly, means are provided whereby, in the event of such variation occuring, the relative positions of two mould members can be readjusted, to restore the initial uniform wall thickness. For this purpose, the locating ring 22 is made so that it is capable of radial adjustment to permit correction of the relative positions of the two mould members. A simple and convenient means by which this can be effected is shown in FIG. 2. The locating ring 22 is interrupted by a series of radial cuts 32, to provide a series of isolated arcuate ring segments. Each segment is secured by one of the bolts 23; if desired, each segment can be fastened by two or more such bolts. A small clearance exaggerated, as shown in FIG. 1 of the drawings, is provided between the bolts 23 and the holes through which they pass but since the radial adjustment required is usually extremely small, the clearance is correspondingly small. Cap screws 33 with locking nuts 34 are used to assist in adjusting and holding in adjusted position, the individual segments.

The mould may include a stripping ring 35 having spring loaded stripper pins 36.

By means of a mould of the type described, it has been found possible to mould consistently thin walled containers, the wall thickness being less than that possible with conventional forms of mould. For example, it has been found possible to mould consistently containers having a wall thickness of approximately 0.013 inches and; by maintenance of the moulding machine by adjustment of the segments of the locating ring 23, such wall thicknesses have been maintained.

I claim:

1. A mould for an injection moulding machine, comprising: a pair of mould parts which are movable along an axis towards and away from each other between open and closed positions, said mould parts each having moulding surfaces including side walls which, in said closed position of said mould parts, define a mould cavity; location means carried by each of the mould parts including locating surfaces, additional to said moulding surfaces, which co-operate when said mould parts are in said closed position and determine the relative positions of said mould parts radially of said axis and determine the relative position of said side walls, said location means of one of said mould parts being adjustable thereon for moving said locating surface of said one mould part relative to said side wall moulding surface of said one part to thereby adjust the relative radial positions of the side walls of said moulding surfaces when the mould parts are in said closed position.

2. A mould as claimed in claim 1, wherein said locating surfaces are frusto conical.

3. A mould as claimed in claim 2, wherein said location means of said one mould part includes a locating ring which is radially adjustable relative to said moulding surface of said one mould part.

4. A mould as claimed in claim 3, wherein said locating ring comprises a plurality of circumferentially spaced ring segments which are individually adjustable radially of said axis.

5. A mould as claimed in claim 4, wherein said locating ring segments are secured on said one mould part by bolts, and screws are provided for adjusting said ring segments in the radial direction.

6. A mould as claimed in claim 1 wherein said mould cavity has the shape of a container with a circular cross-section.

* * * * *